(12) United States Patent
Asnaashari et al.

(10) Patent No.: US 8,396,995 B2
(45) Date of Patent: Mar. 12, 2013

(54) MEMORY CONTROLLERS, MEMORY SYSTEMS, SOLID STATE DRIVES AND METHODS FOR PROCESSING A NUMBER OF COMMANDS

(75) Inventors: Mehdi Asnaashari, Danville, CA (US);
Yu-Song Liao, San Jose, CA (US);
Jui-Yao Yang, San Jose, CA (US);
Siamack Nemazie, Los Altos Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/599,594

(22) Filed: Aug. 30, 2012

(65) Prior Publication Data

US 2012/0324180 A1    Dec. 20, 2012

Related U.S. Application Data

(62) Division of application No. 13/242,535, filed on Sep. 23, 2011, now Pat. No. 8,260,973, which is a division of application No. 12/421,093, filed on Apr. 9, 2009, now Pat. No. 8,055,816.

(51) Int. Cl.
*G06F 3/00*     (2006.01)
*G06F 13/00*    (2006.01)
(52) U.S. Cl. ............ 710/6; 710/8; 710/10; 710/33
(58) Field of Classification Search ............. None
See application file for complete search history.

(56) References Cited

U.S. PATENT DOCUMENTS

| | | | |
|---|---|---|---|
| 4,654,791 A | 3/1987 | Ushiro | |
| 4,797,812 A | 1/1989 | Kihara | |
| 4,811,306 A | 3/1989 | Boning et al. | |
| 5,182,800 A | 1/1993 | Farrell et al. | |
| 5,517,670 A | 5/1996 | Allen et al. | |
| 5,526,484 A | 6/1996 | Casper et al. | |
| 5,539,918 A | 7/1996 | Allen et al. | |
| 5,564,055 A | 10/1996 | Asnaashari et al. | |
| 5,640,596 A | 6/1997 | Takamoto et al. | |
| 5,717,952 A | 2/1998 | Christiansen et al. | |
| 5,742,792 A | 4/1998 | Yanai et al. | |
| 5,901,327 A | 5/1999 | Ofek | |
| 5,928,370 A | 7/1999 | Asnaashari | |
| 5,978,890 A | 11/1999 | Ozawa et al. | |
| 6,012,104 A | 1/2000 | Van Nguyen et al. | |
| 6,076,137 A | 6/2000 | Asnaashari | |
| 6,134,151 A | 10/2000 | Estakhri et al. | |
| 6,173,377 B1 | 1/2001 | Yanai et al. | |
| 6,185,521 B1 | 2/2001 | Vishlitzky | |

(Continued)

FOREIGN PATENT DOCUMENTS

JP    2004/013473 A    1/2004

OTHER PUBLICATIONS

International Search Report and Written Opinion for related PCT Application PCT/US20101000732, mailed Nov. 3, 2010 (9 pgs.).

(Continued)

*Primary Examiner* — Scott Sun
(74) *Attorney, Agent, or Firm* — Brooks, Cameron & Huebsch, PLLC

(57) ABSTRACT

The present disclosure includes methods and devices for a memory controller. In one or more embodiments, a memory controller includes a plurality of back end channels, and a command queue communicatively coupled to the plurality of back end channels. The command queue is configured to hold host commands received from a host. Circuitry is configured to generate a number of back end commands at least in response to a number of the host commands in the command queue, and distribute the number of back end commands to a number of the plurality of back end channels.

20 Claims, 9 Drawing Sheets

U.S. PATENT DOCUMENTS

| | | | |
|---|---|---|---|
| 6,192,444 | B1 | 2/2001 | White et al. |
| 6,233,660 | B1 | 5/2001 | Vishlitzky |
| 6,321,292 | B1 | 11/2001 | Ozawa et al. |
| 6,327,639 | B1 | 12/2001 | Asnaashari |
| 6,470,432 | B2 | 10/2002 | Ozawa et al. |
| 6,915,378 | B2 | 7/2005 | Roberti |
| 7,102,671 | B1 | 9/2006 | Asnaashari |
| 7,296,110 | B2 | 11/2007 | Chung et al. |
| 7,373,465 | B2 | 5/2008 | Hiramatsu et al. |
| 2002/0078292 | A1* | 6/2002 | Chilton .................. 710/305 |
| 2002/0120741 | A1* | 8/2002 | Webb et al. ............. 709/225 |
| 2002/0199072 | A1 | 12/2002 | Fanning |
| 2005/0021921 | A1 | 1/2005 | Blackmon et al. |
| 2005/0036453 | A1 | 2/2005 | Lin et al. |
| 2006/0123200 | A1* | 6/2006 | Ito et al. ................ 711/143 |
| 2006/0271697 | A1 | 11/2006 | Kruse et al. |
| 2007/0283109 | A1 | 12/2007 | Kelly |
| 2008/0016294 | A1 | 1/2008 | Hillier, III et al. |
| 2008/0107275 | A1 | 5/2008 | Asnaashari |
| 2008/0140919 | A1 | 6/2008 | Torabi et al. |
| 2008/0177909 | A1 | 7/2008 | Sapp et al. |
| 2008/0235443 | A1 | 9/2008 | Chow et al. |
| 2008/0282016 | A1 | 11/2008 | Chun-Ting et al. |
| 2008/0320209 | A1 | 12/2008 | Lee et al. |
| 2009/0019235 | A1* | 1/2009 | Harada et al. ............ 711/143 |
| 2009/0150605 | A1* | 6/2009 | Flynn et al. ............. 711/112 |

OTHER PUBLICATIONS

Intel Dual-Channel DDR Memory Architecture, Sep. 2003, Infinion Technologies & Kingston Technology, [online, accessed Jul. 15, 2011], URL: http://www.kingston.com/newtech/mkf_520ddrwhitepaper.pdf.

European Search Report and Opinion for related PCT Application No. PCT/US2010000732, mailed Nov. 20, 2012, (6 pgs.).

* cited by examiner

686A

| CMD 1 | PROGRAM LBA 1000, 16 SECTORS | ~ 687-1A |
|---|---|---|
| CMD 2 | READ LBA 2000, 4 SECTORS | ~ 687-2A |
| CMD 3 | PROGRAM LBA 1000, 48 SECTORS | ~ 687-3A |
| CMD 4 | READ LBA 2002, 10 SECTORS | ~ 687-4A |
| CMD 5 | READ LBA 2000, 16 SECTORS | ~ 687-5A |
| CMD 6 | PROGRAM LBA 1040, 16 SECTORS | ~ 687-6A |
| CMD 7 | PROGRAM LBA 3000, 2 SECTORS | ~ 687-7A |
| CMD 8 | PROGRAM LBA 3002, 2 SECTORS | ~ 687-8A |
| | ⋮ | |
| CMD C | COMMAND SLOT C | ~ 687-C |

| CMD 1 | PROGRAM LBA 1000, 56 SECTORS | ~ 687-1B |
|---|---|---|
| CMD 2 | READ LBA 2000, 16 SECTORS | ~ 687-2B |
| CMD 3 | PROGRAM LBA 3000, 4 SECTORS | ~ 687-3B |
| | ⋮ | |
| CMD C | COMMAND SLOT C | ~ 687-CB |

*Fig. 6B*

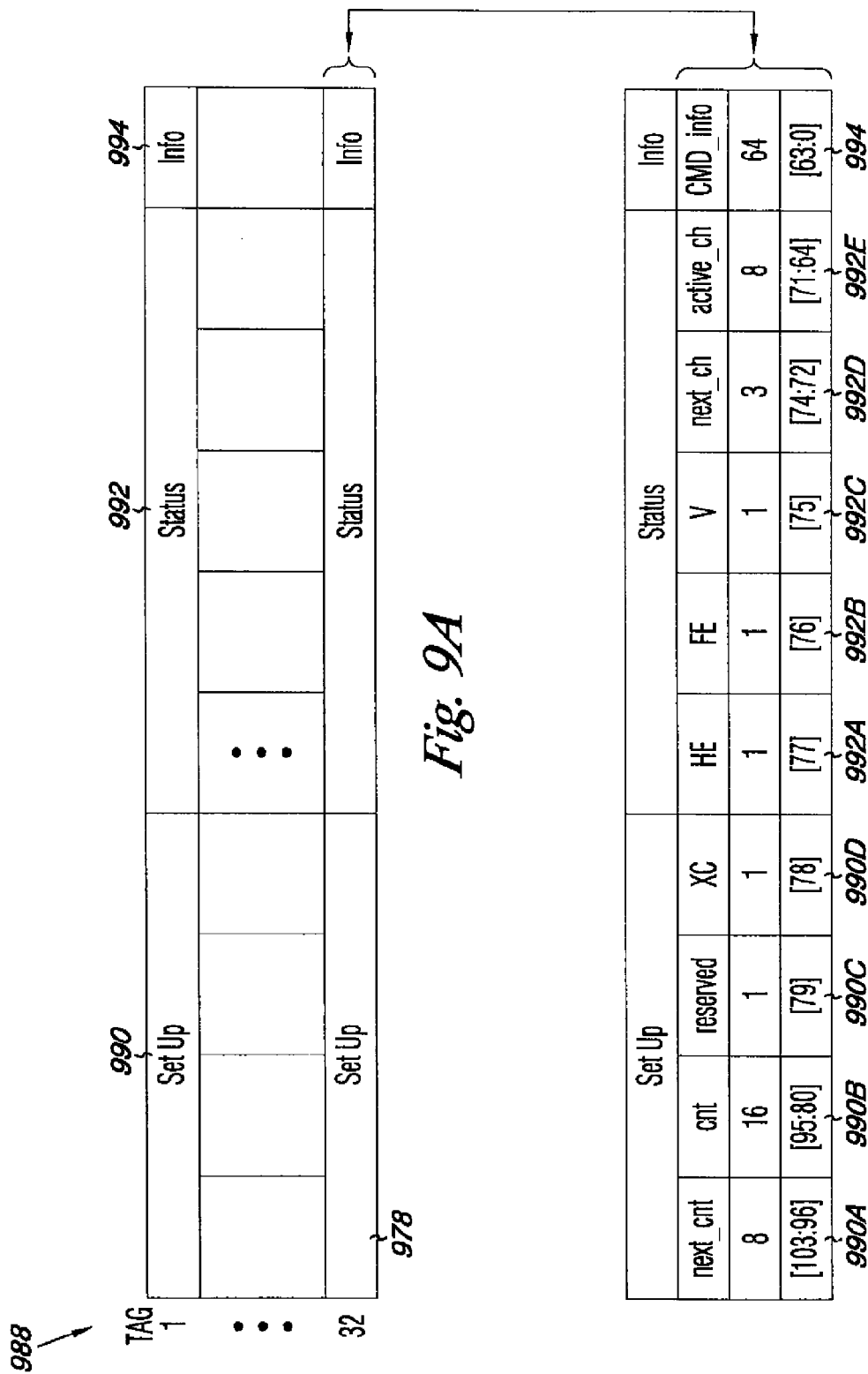

MEMORY CONTROLLERS, MEMORY SYSTEMS, SOLID STATE DRIVES AND METHODS FOR PROCESSING A NUMBER OF COMMANDS

CROSS-REFERENCE TO RELATED APPLICATION

This application is a Divisional of U.S. application Ser. No. 13/242,535, filed Sep. 23, 2011, to be issued on Sep. 4, 2012 as U.S. Pat. No. 8,260,973, which is a Divisional of U.S. application Ser. No. 12/421,093, filed Apr. 9, 2009, now U.S. Pat. No. 8,055,816, the specifications of which are incorporated herein by reference.

TECHNICAL FIELD

The present disclosure relates generally to semiconductor memory devices, methods, and systems, and more particularly, to memory controllers, memory systems, solid state drives and methods for processing a number of commands.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), synchronous dynamic random access memory (SDRAM), among others. Non-volatile memory can provide persistent data by retaining stored information when not powered and can include NAND flash memory, NOR flash memory, read only memory (ROM), electrically erasable programmable ROM (EEPROM), erasable programmable ROM (EPROM), and phase change random access memory (PCRAM), among others.

Memory devices can be combined together to form a solid state drive (SSD). An SSD can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the SSD can have advantages over hard drives in terms of performance, size, weight, ruggedness, operating temperature range, and power consumption. For example, SSDs can have superior performance when compared to magnetic disk drives due to their lack of moving parts, which may improve seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD may include a number of memory devices, e.g., a number of memory chips (as used herein, "a number of" something can refer to one or more such things; e.g., a number of memory devices can refer to one or more memory devices). As one of ordinary skill in the art will appreciate, a memory chip may include a number of dies. Each die may include a number of memory arrays and peripheral circuitry thereon. A memory array may include a number of planes, with each plane including a number of physical blocks of memory cells. Each physical block may include a number of pages that can store a number of sectors of data.

Memory systems, e.g., an SSD, may be incorporated into a computing system, the memory system can be communicatively coupled to a host by a communication interface, e.g., a Serial Advanced Technology Attachment (SATA) high speed serial bus primarily designed for transfer of commands and data between the host and mass storage devices, such as hard disk drives, optical drives, and SSDs.

Commands, such as program commands, read commands, and erase commands, among other commands, may be used during operation of an SSD. For example, a program, e.g., write, command may be used to program data on a solid state drive, a read command may be used to read data on a solid state drive, and an erase command may be used to erase data on a solid state drive.

BRIEF DESCRIPTION OF THE DRAWINGS

FIGS. 6A and 6B illustrate operation of a command queue of a front end DMA, in accordance with one or more embodiments of the present disclosure.

FIG. 9A is a functional block diagram of a Direct Memory Access module (DMA) Descriptor Block, implemented in accordance with one or more embodiments of the present disclosure.

FIG. 9B illustrates an entry in the DMA Descriptor Block (DDB) illustrated in FIG. 9A, implemented in accordance with one or more embodiments of the present disclosure.

DETAILED DESCRIPTION

Figure 1:
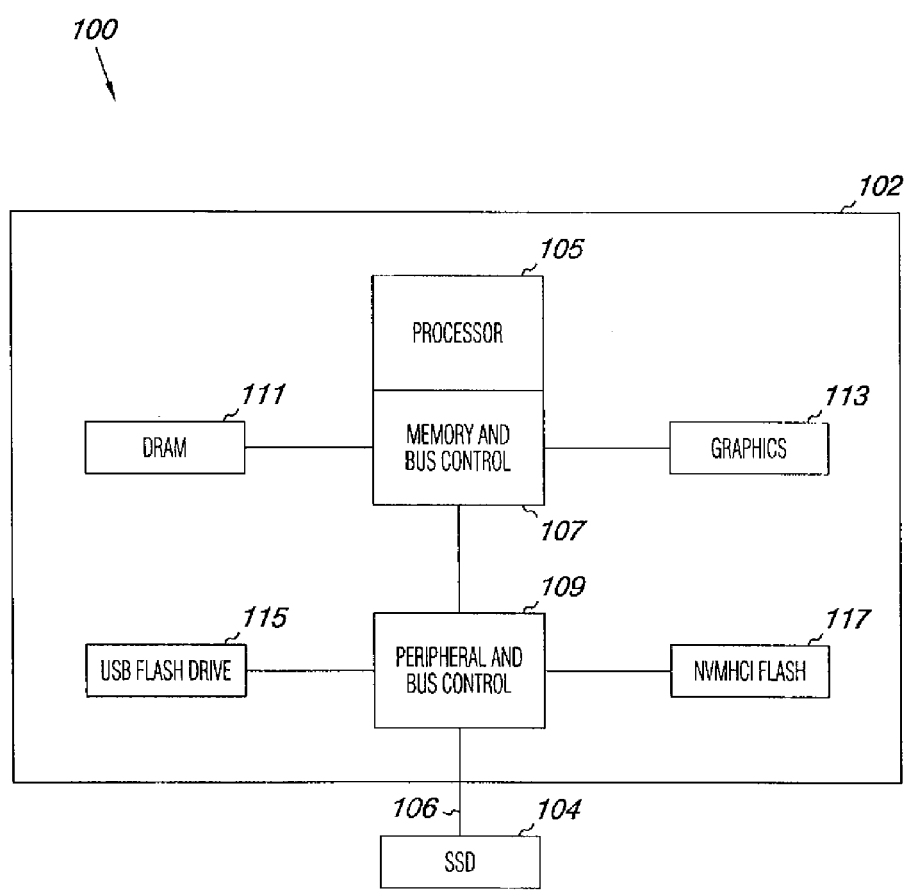
FIG. 1 is a functional block diagram of a computing system, in accordance with one or more embodiments of the present disclosure.

The present disclosure includes memory controllers, memory systems, solid state drives and methods for processing a number of commands. In one or more embodiments, a memory controller includes a plurality of back end channels, and a command queue communicatively coupled to the plurality of back end channels. The command queue can be configured to hold host commands received from a host. Circuitry is configured to generate a number of back end commands at least in response to a number of the host commands in the command queue, and distribute the number of back end commands to a number of the plurality of back end channels.

The present disclosure also includes methods and devices for a memory controller. In one or more embodiments, a memory controller includes a plurality of back end channels, and a front end command dispatcher communicatively coupled to the plurality of back end channels and a command queue. The command dispatcher can be configured to determine a net change to memory to be accomplished by the number of commands, and to modify one or more of the number of commands in order to optimize distribution of the number of commands among the plurality of back end channels.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2, etc.

FIG. 1 is a functional block diagram of a computing system, in accordance with one or more embodiments of the present disclosure. The embodiment of FIG. 1 illustrates the components and architecture of one embodiment of a computing system 100. Computing system 100 includes a memory system 104, for example a solid state drive (SSD), communicatively coupled to a host, such as host 102, through an interface 106, e.g., USB, PCI, SATA/150, SATA/300, or SATA/600 interface, among others.

SATA was designed as a successor to the Advanced Technology Attachment (ATA) standard, which is often referred to as Parallel ATA (PATA). First-generation SATA interfaces, also known as SATA/150 or unofficially as SATA 1, communicate at a rate of about 1.5 gigabits per second (Gb/s), or 150 megabytes per second (MB/s). Subsequently, a 3.0 Gb/s signaling rate was added to the physical layer, effectively doubling the maximum, e.g., uppermost data throughput from 150 MB/s to 300 MB/s. The 3.0 Gb/s specification, also known as SATA/300 or unofficially as SATA II or SATA2. SATA/300's transfer rate may satisfy magnetic hard disk drive throughput requirements for some time; however, solid state drives using multiple channels of fast flash may support much higher data transfer rates, so even faster SATA standards, e.g., SATA/600 having a throughput of 6 Gb/s, may be implemented in supporting flash solid state drive read speeds.

The host 102 can include a number of separate integrated circuits, or more than one component or function can be on the same integrated circuit. According to one or more embodiments, the host 102 can be physically implemented in a computing system 100, at least in part, as a "motherboard," with the SSD 104 being physically implemented on a separate card, the motherboard and SSD being communicatively coupled through a bus.

Host 102 can include a number of processors 105, e.g., parallel processors, co-processors, processor cores, etc., communicatively coupled to a memory and bus control 107. The number of processors 105 can be a microprocessor, or some other type of controlling circuitry such as an application-specific integrated circuit (ASIC). Other components of the computing system may also have processors. The memory and bus control 107 can have memory and other components directly communicatively coupled thereto, for example, dynamic random access memory (DRAM) 111, graphic user interface 113, or other user interface, e.g., display monitor, keyboard, mouse, etc.

The memory and bus control 107 can also have a peripheral and bus control 109 communicatively coupled thereto, which in turn, can connect to a number of devices, such as such as a flash drive 115 using a universal serial bus (USB) interface, a non-volatile memory host control interface (NVMHCI) flash memory 117, or an SSD 104. As the reader will appreciate, a SSD 104 can be used in addition to, or in lieu of, a hard disk drive (HDD) in a number of different computing systems. The computing system 100 illustrated in FIG. 1 is one example of such a system.

Figure 2:
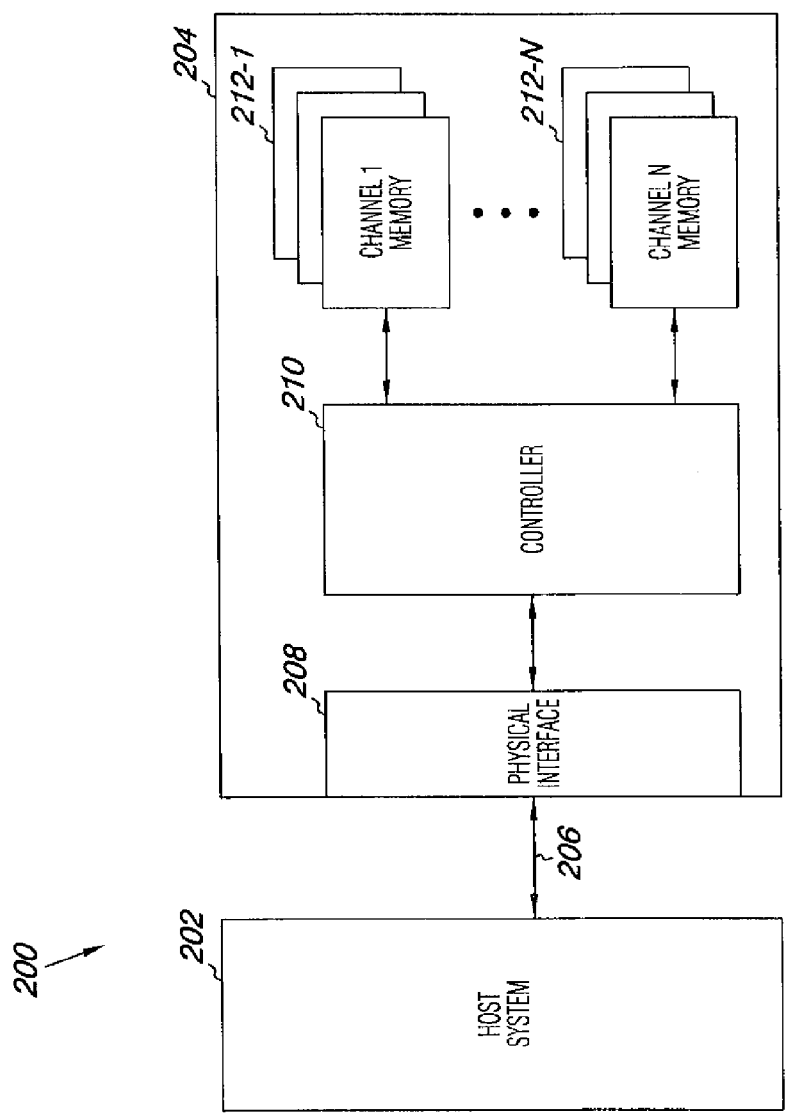
FIG. 2 is a functional block diagram of a computing system including at least one memory system, in accordance with one or more embodiments of the present disclosure.

FIG. 2 is a functional block diagram of a computing system including at least one memory system, in accordance with one or more embodiments of the present disclosure. Computing system 200 includes a memory system 204, e.g., a SSD, communicatively coupled to host 202. SSD 204 can be communicatively coupled to the host 202 through an interface 206, e.g., cable, bus, such as a SATA interface. SSD 204 can be analogous to the solid state drive 104 in FIG. 1.

FIG. 2 illustrates the components of one or more embodiments of a solid state drive 204, including a controller 210, a physical interface 208, e.g., a connector, and a number of memory devices 212-1, . . . , 212-N, a number of memory devices corresponding to a number of channels of the controller 210 (e.g., one or more memory devices corresponding to a particular channel). Accordingly, memory devices 212-1, . . . , 212-N are shown on the drawings as "channel No. memory." As used herein, a memory device can include a number of memory cells, e.g., die, chip, array, or other group, that share control inputs, and may be fabricated using a number of memory types, e.g., NAND flash. Control inputs can generally include address latch enable (ALE), chip enable (CE), read enable (RE), ready/busy (RIB), write protect (WP), and input/output (I/O) connections such as pins, pads, or the like. In one or more embodiments, the SSD 204 can include a housing to enclose the SSD 204, though such housing is not essential, for example, the host 202 and SSD 204 may both be enclosed by a computing system housing.

The interface 206 can be used to communicate information between SSD 204 and another device, such as a host 202. According to one or more embodiments, SSD 204 can be used as a storage device in computing system 200. According to one or more embodiments, SSD 204 can be configured as an external, or portable, memory system for computing system 200, e.g., with plug-in connectivity.

The controller 210 can communicate with the memory devices 212-1, . . . , 212-N to operate, e.g., read, program (i.e., write), erase, etc., the memory cells of the memory devices. The controller 210 can be used to manage communications with, and the data stored in, the memory devices 212-1, . . . , 212-N. Controller 210 can have circuitry that can be a number of integrated circuits. Controller 210 can also have circuitry that can be a number of discrete components as well. For one or more embodiments, the circuitry in controller 210 can include control circuitry for controlling access across a number of channels, and across a number of memory devices 212-1, . . . , 212-N. The memory controller 210 can selectively communicate through the number of channels to the corresponding memory device(s).

The communication protocol between the host 202 and the SSD 204 may be different than what is required for accessing a memory device e.g., memory devices 212-1, . . . , 212-N. Memory controller 210 can include control circuitry configured to translate commands received from the host 202 into appropriate commands to accomplish the intended operation across the number of memory devices 212-1, . . . , 212-N. Circuitry of the memory controller 210 can provide a translation layer between the host 202 and the SSD 204. Memory controller 210 can also process host command sequences, the associated data, and other information, e.g., signals, to appropriate channel command sequences, for example to store and retrieve data. Memory controller 210 can selectively distribute commands, communicate (e.g., receive, send, transmit)

associated data, and other information, through an appropriate channel to a corresponding memory device at an appropriate time.

According to one or more embodiments of the present disclosure, each memory device 212-1, . . . , 212-N can include a number of memory cells. The memory devices 212-1, . . . , 212-N can be formed using various types of volatile or non-volatile memory arrays, e.g., NAND flash, DRAM, among others. According to one or more embodiments of the present disclosure, the memory devices 212-1, . . . , 212-N can include a number of flash memory cells configured in a NAND architecture, a NOR architecture, an AND architecture, or some other memory array architecture, all of which may be used in implementing one or more embodiments of the present disclosure.

Memory devices 212-1, . . . , 212-N can include a number of memory cells that can be configured to provide particular physical or logical configurations, such as a page, block, plane, array, or other group. A page can store data in accordance with a number of physical sectors of data. Each physical sector can correspond to a logical sector and can include overhead information, such as error correction code (ECC) information and logical block address (LBA) information, as well as user data. As one of ordinary skill in the art will appreciate, logical block addressing is a scheme often used by a host for identifying a logical sector of information. As an example, a logical sector can store information representing a number of bytes of data, e.g., 256 bytes, 512 bytes, or 1,024 bytes. As used herein, a page refers to a unit of programming and/or reading, e.g., a number of cells, or portions of data stored thereon, that can be programmed and/or read together or as a functional group. For example, some memory arrays can include a number of pages that make up a block of memory cells, a block including memory cells which can be erased together as a unit, e.g., the cells in each physical block can be erased in a substantially simultaneous manner. A number of blocks can be included in a plane of memory cells. A number of planes of memory cells can be included on a die. An array can include a number of die. By way of example, and not of limitation, a 128 Gb memory device can include 4314 bytes of data per page, 128 pages per block, 2048 blocks per plane, and 16 planes per device. However, embodiments are not limited to this example.

Each memory device 212-1, . . . , 212-N can include various types of volatile and non-volatile memory arrays, e.g., flash and DRAM arrays, among others. In one or more embodiments, memory devices 212-1, . . . , 212-N can be solid state memory arrays. Memory devices 212-1, . . . , 212-N can include a number of memory cells that can be grouped in units. As used herein, a unit can include a number of memory cells, such as a page, physical block, plane, an entire array, or other groups of memory cells. For example, a memory device can be a memory array and include a number of planes, with each plane including a number of physical blocks. The memory cells in each physical block can be erased together as a unit, e.g., the cells in each physical block can be erased in a substantially simultaneous manner. For example, the cells in each physical block can be erased together in a single operation. A physical block can include a number of pages. The memory cells in each page can be programmed together as a unit, e.g., the cells in each page can be programmed in a substantially simultaneous manner. The memory cells in each page can also be read together as a unit.

A physical sector of a memory system can correspond to a logical sector, and can include overhead information, such as error correction code (ECC) information and logical block address (LBA) information, as well as user data. As one of ordinary skill in the art will appreciate, logical block addressing is a scheme often used by a host for identifying a logical sector of information. As an example, each physical sector can store information representing a number of bytes of data, e.g., 256 bytes, 512 bytes, or 1,024 bytes, among other numbers of bytes. However, embodiments of the present disclosure are not limited to a particular number of bytes of data stored in a physical sector or associated with a logical sector.

Figure 3:
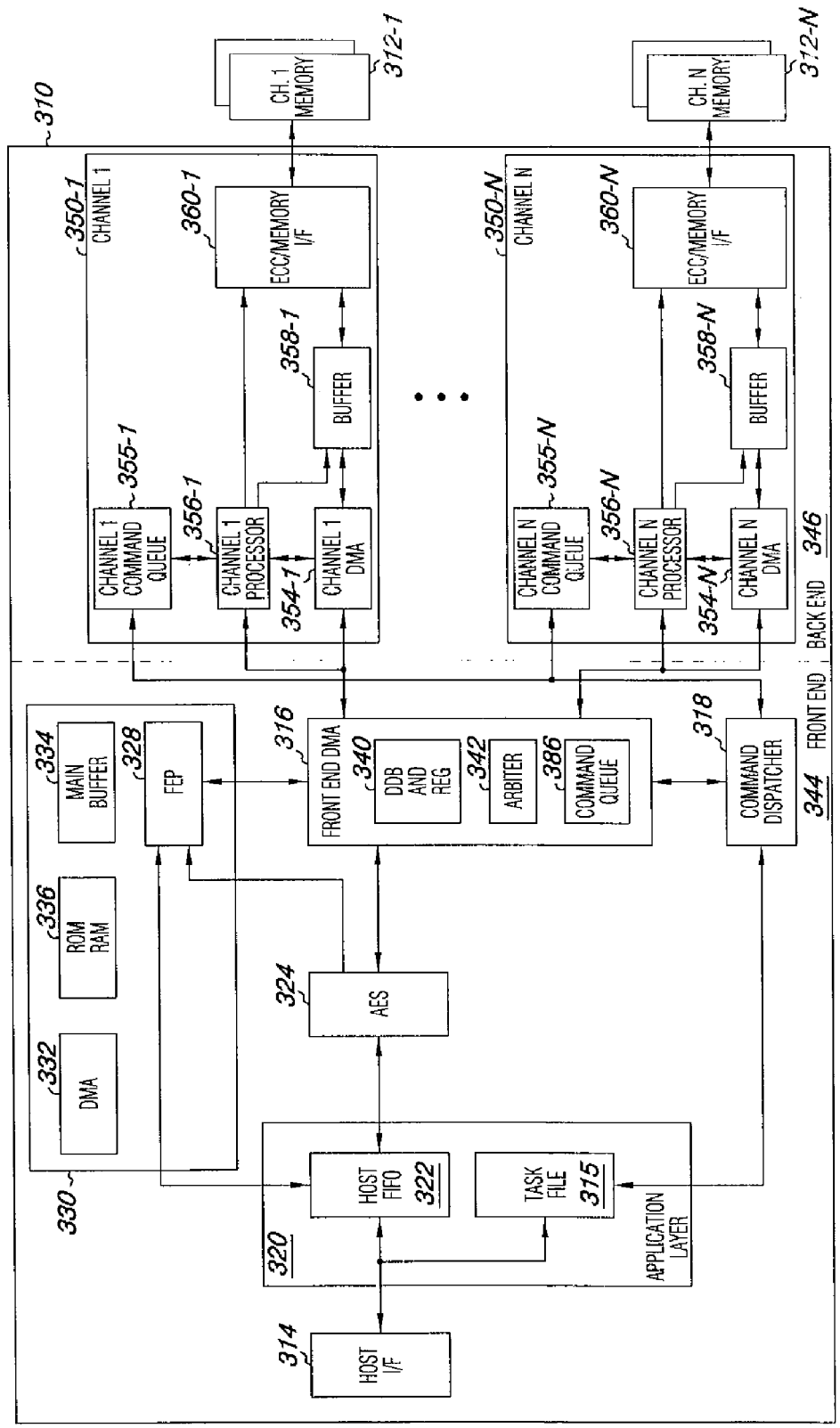
FIG. 3 is a functional block diagram of a memory system controller communicatively coupled to a number of memory devices, in accordance with one or more embodiments of the present disclosure.

FIG. 3 is a functional block diagram of a memory system controller communicatively coupled to a number of memory devices, in accordance with one or more embodiments of the present disclosure. As shown in FIG. 3, memory controller 310 can be communicatively coupled to a number of, e.g., eight, memory devices, e.g., 312-1, . . . , 312-N. In one or more embodiments, the memory devices can be those shown at 212-1, . . . , 212-N in FIG. 2. Each memory device, e.g., 312-1, . . . , 312-N, corresponds to a channel, e.g., 350-1, . . . , 350-N, of the controller 310. As used herein, a memory device can include a number of memory cells that share control inputs, as previously discussed. In one or more embodiments, memory controller 310 can be an SSD controller. In one or more embodiments, memory controller 310 can be analogous to controller 210 shown in FIG. 2.

Each memory device, e.g., 312-1, . . . , 312-N, can be organized as previously described with respect to memory devices 212-1, . . . , 212-N, and can be fabricated on individual dies, or can be fabricated on stacked dies. Each die can include a number of arrays of memory cells. The memory controller 310 can include a front end portion 344 and a back end portion 346. The controller 310 can process commands and data in the front end 344, e.g., to optimize distribution of the number of commands among the plurality of back end channels, such as by reducing the quantity of commands transmitted on to the back end portion 346. The controller 310 can further process commands and data in each of the back end channels to achieve additional efficiency of memory operations with regard to a particular channel. In this manner, the controller 310 manages communications with the memory devices 312-1, . . . , 312-N.

As shown in FIG. 3, the front end portion 344 can include a host interface 314 communicatively coupled to a task file 315 and a host buffer 322, e.g., FIFO, of an application layer 320. For example, the host interface 314 can be configured to communicate input and output information, e.g., data streams, with a host, e.g., 202 in FIG. 2, through the physical interface on an SSD, e.g., 208 in FIG. 2, and a SATA interface, e.g., 206 in FIG. 2. According to one or more embodiments, a command (including the command parameters), e.g., a command portion of the input information, can be directed to the task file 315, and an associated payload, e.g., a data portion of the input information, can be directed to the host FIFO 322.

The task file 315 can be a one deep queue and can be in communication with a front end direct memory access module (DMA) 316 through a command processor and dispatcher 318 (hereinafter "command dispatcher"). Command dispatcher 318 is configured (e.g., includes hardware) such that it can check the command in the task file 315 on arrival from the host against certain criteria (e.g., integrity checking), and once verified with respect to the criteria, can accept the arriving command, and can distribute it from the task file 315 to the front end DMA 316 and to appropriate back end channels. Previous approaches to integrity checking have been performed using firmware; however, performing host command integrity checking in hardware is faster, resulting in increased host command processing speed by the command dispatcher 318.

The host FIFO 322 can be communicatively coupled to an encryption device 324 having a number of encryption engines, e.g., encryption engines implementing an AES algorithm. The encryption device 324 may be configured to process, e.g., encrypt, a payload associated with a particular command, and transmit the payload to the front end DMA 316. Additional detail on the operation of the encryption device 324 can be found in commonly assigned U.S. patent application Ser. No. 12/333,822, filed on Dec. 12, 2008, entitled "Parallel Encryption/Decryption", having at least one common inventor.

The front end portion 344 can also have a number of other processors 330, which can include a front end processor (FEP) 328, memory 336, e.g., RAM, ROM, a DMA 332, and a main buffer 334. The number of processors 330 can be communicatively coupled to the front end DMA 316, for example, by a communication bus.

The front end DMA 316 can include a DMA descriptor block (DDB) and register 340, including associated registers, for containing a number of words of data. The front end DMA 316 can also include an arbiter 342 for arbitrating between a number of channels communicatively coupled thereto. The encryption device 324 can also be communicatively coupled to the FEP 328. The FEP 328 can also be communicatively coupled directly to the host FIFO 322, and to the front end DMA 316.

The front end DMA 316 can be communicatively coupled to the command dispatcher 318. The controller 310 can include a number of channels, e.g., 1, . . . , N, corresponding to the number of memory devices, e.g., 312-1, . . . , 312-N. The relationship between the number of channels and the number of memory devices is described herein, and shown in the figures, as being a one-to-one relationship; however, embodiments of the present disclosure are not so limited, and other configurations are contemplated (e.g., multiple memory devices corresponding to a particular channel, a particular memory device corresponding to multiple channels, or combinations thereof). The front end DMA 316 and command dispatcher 318 effectively communicatively couple the front end 344 circuitry to the back end circuitry 346, e.g., back end channel 1 (350-1), . . . , back end channel N (350-N). According to one or more embodiments of the present disclosure, the controller 310 includes eight channels, e.g., 1, . . . , 8. Embodiments of the present invention are not limited to controllers having eight channels, thus, controllers may be implemented having a greater or lesser quantity of channels than eight.

Referring now to the back end portion 346 of controller 310, the back end portion 346 includes the number of channels, e.g., 350-1, . . . , 350-N. Each back end channel can include a channel processor, e.g., 356-1, . . . , 356-N, and associated channel DMA, e.g., 354-1, . . . , 354-N, each of which can be communicatively coupled to the front end DMA 316. The command dispatcher 318 can be configured to distribute commands to a respective channel processor, e.g., 356-1, . . . , 356-N, through a channel command queue, e.g., 355-1, . . . , 355-N. In one or more embodiments, the channel command queues, e.g., 355-1, . . . , 355-N, can hold a number of commands received from the command dispatcher 318.

The front end DMA 316 can be configured to distribute data associated with a particular command to a corresponding channel DMA, e.g., 354-1, . . . , 354-N. The channel DMA, e.g., 354-1, . . . , 354-N, can be communicatively coupled to a channel buffer, e.g., 358-1, . . . , 358-N, which in turn can be communicatively coupled to an error correcting code (ECC) and memory interface module, e.g., 360-1, . . . , 360-N. The channel processor, e.g., 356-1, . . . , 356-N, can also be communicatively coupled to the ECC/memory interface, e.g., 360-1, . . . , 360-N, channel DMA, e.g., 354-1, . . . , 354-N, and channel buffer, e.g., 358-1, . . . , 358-N.

Although the embodiment shown in FIG. 3 illustrates each back end channel 350-1, . . . , 350-N as including a back end channel processor, e.g., 356-1, . . . , 356-N, embodiments of the present disclosure are not so limited. For example, the back end portion 346 can include circuitry such as a shared back end processor, including, e.g., hardware logic such as an application-specific integrated circuit (ASIC), which can operate on a number of back end channels, e.g., 350-1, . . . , 350-N. Accordingly, the shared back end processor can be communicatively coupled to communicate with the command dispatcher 318 and front end DMA 316 analogous to that described for the dedicated channel processors, e.g., 356-1, . . . , 356-N. As shown in FIG. 3, a particular memory device, e.g., 312-1, . . . , 312-N, corresponds to each channel, e.g., 350-1, . . . , 350-N, such that the access to the particular memory device can be through the corresponding channel.

Host interface 314 can be the communication interface between the controller 310 and a host. In one or more embodiments, information communicated between the host and the controller can include a number of commands, such as program (e.g., write) commands, read commands, erase commands. The commands can be used to operate the associated memory device.

Command dispatcher 318 can receive a number of commands from the host, e.g., 202 in FIG. 2, through the host interface 314 and application layer 320. Command dispatcher 318 can hold the received commands, and can distribute commands to the respective channel command queue, e.g., 355-1, . . . , 355-N, of a number of respective back end channels, e.g., 350-1, . . . , 350-N, and to the front end DMA 316.

A payload can be associated with the command. For example, for a command to write to memory, the associated payload can be the data that is to be written. The payload associated with a particular command can be received at the front end DMA 316 through the host FIFO 322 and AES 324. The front end DMA 316 can distribute data associated with a particular command in the command dispatcher 318 to a channel DMA, e.g., 354-1, . . . , 354-N, or directly to the corresponding channel buffer, e.g., 358-1, . . . , 358-N. The channel DMA, e.g., 354-1, . . . , 354-N, can distribute data associated with a particular command to the corresponding channel buffer, e.g., 358-1, . . . , 358-N. In one or more embodiments, the channel buffers, e.g., 358-1, . . . , 358-N, can hold data corresponding to a number of commands, the data being received from the front end DMA 316, through the channel DMA, e.g., 354-1, . . . , 354-N.

In one or more embodiments, the information communicated from the host, e.g., 202 in FIG. 2, to the command dispatcher 318 of the controller 318, can include a number of commands, such as program commands, read commands, and erase commands, among others. A program command can be used to write data to memory, e.g., memory devices 312-1, . . . , 312-N, a read command can be used to read data from memory, and an erase command may be used to erase a portion of the memory. The commands can indicate the type of operation, e.g., program, read, erase, along with the start location, e.g., an LBA, and quantity, e.g., number of logical sectors, of memory involved in the memory operation.

In one or more embodiments, an LBA can be associated with a logical sector of the host, e.g., each logical sector of a host can be associated with a particular LBA. For example, LBA 1000 can be associated with a first logical sector, LBA 1001 can be associated with a second logical sector, LBA 1002 can be associated with a third logical sector, etc. As a further example, a command to program the memory cells in the array corresponding to 16 logical sectors of data starting at LBA 1000 can program the memory cells associated with LBAs 1000 through 1015, e.g., the memory cells corresponding to the logical sectors of data associated with LBAs 1000 through 1015. Thus, each logical sector of data in a memory array can be referenced by a particular LBA. An LBA can be mapped by the back end 346 to a physical address associated with a particular block of memory, e.g., a starting address of a particular block of memory, or an LBA can mapped to a physical address associated with a particular sector within a block of memory, e.g., a starting address of a particular sector of memory.

Figure 4:
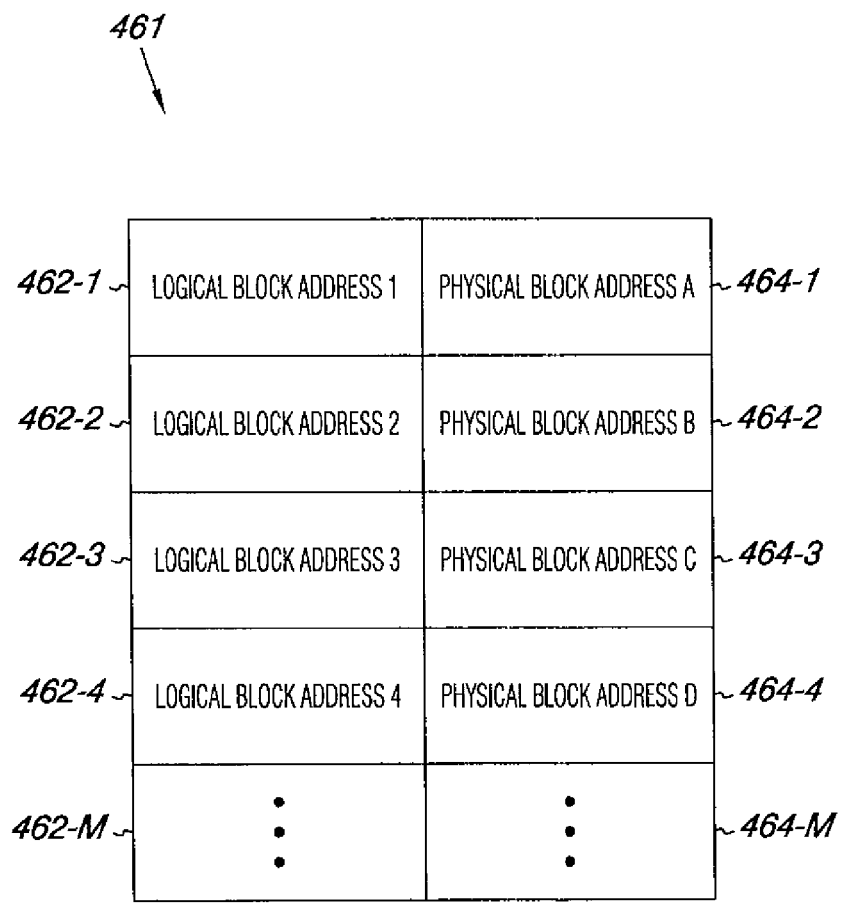
FIG. 4 illustrates a logical-to-physical address map, in accordance with one or more embodiments of the present disclosure.

FIG. 4 illustrates a logical-to-physical address map, implemented in accordance with one or more embodiments of the present disclosure. Address map 461 illustrates the correlation between an LBA and a physical block address (PBA) of the memory devices, e.g., 312-1, . . . , 312-N. For example, LBA 1 (462-1) corresponds to PBA A (464-1), LBA 2 (462-2) corresponds to PBA B (464-2), LBA 3 (462-3) corresponds to PBA C (464-3), LBA 4 (462-4) corresponds to PBA D (464-4), . . . , and LBA M (462-M) corresponds to PBA M (464-M).

Receiving Commands

According to one or more embodiments of the present disclosure, the front end DMA, e.g., 316 in FIG. 3, can include a command queue 386. The front end DMA, e.g., 316 in FIG. 3, can hold a number of commands received from the host through the application layer 320 and command dispatcher 318. Command dispatcher 318 can process the commands, and distribute commands to the front end DMA 316 and a number of appropriate back end channels, e.g., 350-1, . . . , 350-N in FIG. 3. Operations performed by the command dispatcher, e.g., 318 in FIG. 3, can be implemented in hardware, software, or a combination thereof. The command dispatcher, e.g., 318 in FIG. 3, can include a command processor portion and a dispatcher portion. The command processor portion and a dispatcher portion may be discrete hardware modules, or the respective functions may be implemented in an integrated fashion by control circuitry.

Upon receiving a command from the host (hereinafter a "host command"), the command processor portion of the command dispatcher, e.g., 318 in FIG. 3, can check the integrity of the host command, and then pass the host command along to the dispatcher portion of the command dispatcher. According to one or more embodiments of the present disclosure, the command processor portion of the command dispatcher, e.g., 318 in FIG. 3, can be configured to check commands for acceptable LBA range and for a valid tag, among other integrity testing.

The dispatcher portion can distribute the host command to the front end DMA 316 and a number of appropriate back end channels, e.g., 350-1, . . . , 350-N in FIG. 3, and indicate to the application layer 320 the completion status of the command, e.g., whether it has been accepted and processed, which can be communicated to the host to indicate a next host command may be sent. Implementing the functionality of the command dispatcher in hardware can reduce host command processing time, e.g., the time after receipt of a host command from the host to process the command and communicate (e.g., transmit or send) an indicator of the command completion status. Memory system throughput can be increased by reducing the processing time between host commands communicated between the host and the memory system.

Figure 5:
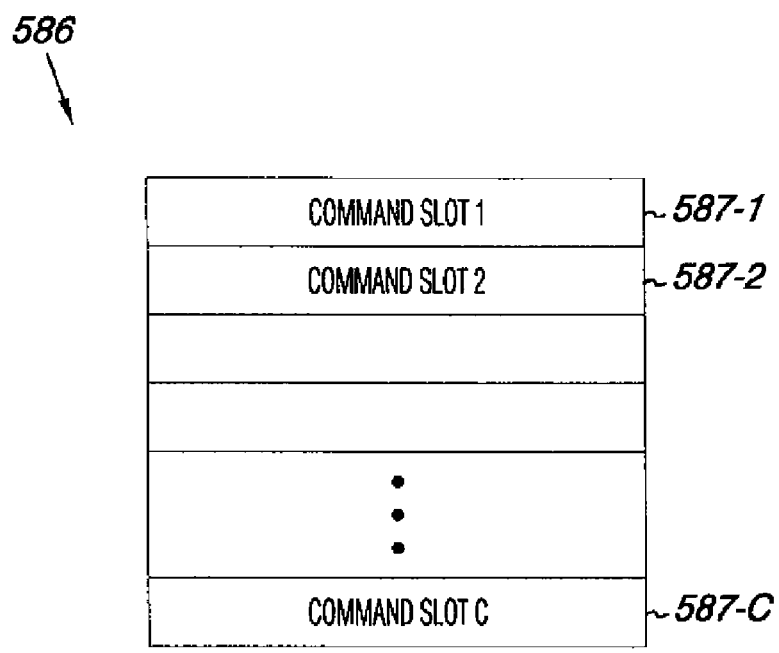
FIG. 5 is a functional block diagram of a command queue of a front end DMA, in accordance with one or more embodiments of the present disclosure.

FIG. 5 is a block diagram of a command queue of a front end DMA, in accordance with one or more embodiments of the present disclosure. Command queue 586 has a capacity of holding a quantity of C commands, e.g., the command queue can have a number of command slots, each command slot able to hold a command, As shown in FIG. 5, command queue 586 includes a number of command slots, e.g., command slot 1 (587-1), command slot 2 (587-2), . . . , command slot C (587-C). For example, in one or more embodiments, a front end DMA, e.g., 316 in FIG. 3, can include a number of command queues 386 having a capacity to store 32 commands; however, embodiments of the present disclosure are not limited to a particular number of commands slots, command queue capacity, or number of commands that can be processed simultaneously by the command dispatcher.

In one or more embodiments, a front end DMA, e.g., 316 in FIG. 3, can receive host commands from the host in an initial order. The number of command queues 386 can hold the number of host commands in the initial order, e.g., in the order they are received from the host. The command queues 386 can hold a finite number of commands at one time; therefore, the command dispatcher is configured to signal the host when the command queue 386 has reached its capacity, and is temporarily unable to receive further host commands from the host.

In one or more embodiments, the command dispatcher, e.g., 318 in FIG. 3, can process the host command held in the task file 315 and can distribute it to the command queue 386 in the front end DMA 316. The command dispatcher 318 can then distribute the host commands from the command queue 386 to the back end channels in an order in which they were received and are queued in the command queue 386, e.g., in an order in which host commands are to be executed, in an order in which host commands can be distributed, in a combination of the aforementioned orders, or according to some other appropriate ordering scheme.

In one or more embodiments, the command processor portion of the command dispatcher is configured to determine whether the commands held in the command queue(s) 386 can be modified, e.g., to optimize distribution of the number of commands among the plurality of back end channels, and to modify host commands, individually or as a group. Modifying commands to economize distribution can include, for example, combining commands to adjacent memory locations and/or deleting commands that are subsequently overwritten without being read from, so that fewer commands are sent to accomplish the same net change to the memory for writing operations or to accomplish the same net read from memory for reading operations, thereby saving time, processing resources, and/or communication bandwidth, among others. As used herein, commands can include host commands, host commands that have been modified, and other types of commands. The command processor portion can analyze and modify commands in the command queue 386 in order to more efficiently distribute commands to the respective channels, make individual commands more efficient, improve reliability of the memory system, improve performance of the memory system, reduce wear of the memory system, or improve the quality, efficiency, or flow of commands among the respective back end channels. For example, the command processor portion can re-order commands within a group of commands, combine (e.g., coalesce) commands by grouping multiple commands into one or more commands, or determine that a particular command is not to be executed (e.g., when it can be determined that a subsequent command will modify data at a particular memory location), among other command optimization techniques. In one or more embodiments, the front end processor (FEP) 328 can also perform these tasks and make these determinations.

FIGS. 6A and 6B illustrate operation of a command queue of a front end DMA, in accordance with one or more embodiments of the present disclosure. According to one or more embodiments, the command dispatcher, e.g., 318 in FIG. 3, and/or FEP, e.g., 328 in FIG. 3, can determine whether the commands held in the command queue of a front end DMA, e.g., 386 in FIG. 3, can be modified, and the command dispatcher can be configured to modify the commands in a manner intended to expedite command throughput of the front end of the controller, e.g., 344 in FIG. 3.

In order to increase command throughput, in one or more embodiments, the command dispatcher 318 or FEP 328 processes host commands to increase throughput only when back end channels are busy (e.g., when associated channel buffers are full). When the back end channels are busy, such as when the associated channel buffers (e.g., 358-1, . . . , 358-N respectively) are full, the front end portion of the controller may be prevented from distributing commands to the back end channels. To the extent that a number of the back end channels are able and willing to accept additional commands, commands should not be delayed to accomplish further optimization processing by the command dispatcher, because delaying emptying the command queue 686A/B delays completion of host commands in the command queue 686A/B, which in turn delays transfer of additional commands from the host, and further optimization of commands may take place in respective channel command queue (perhaps with even greater efficiency) without causing delay in distributing commands to other back end channels. Additional detail on the operation of back end channels can be found in commonly assigned U.S. patent application Ser. No. 12/351,206, entitled "Modifying Commands", having at least one common inventor.

In one or more embodiments, command queue 686A can be analogous to command queue 386 discussed with respect to FIG. 3. Command queue 686A includes a number, e.g., C, of command slots, e.g., 687-1A, 687-2A, 687-3A, 687-4A, 687-5A, 687-6A, 687-7A, 687-8A, . . . , 687-CA. Each of the C command slots can be configured to temporarily store a command, e.g., a host command. For example, command slot 687-1A can store a first command, command slot 687-2A can store a second command, and so on.

In an example discussed below with respect to a front end command dispatcher processing commands in the command queue 686A, and illustrated in FIG. 6A, the command in command slot 1, e.g., 687-1A, can be a command to program, e.g., write, data to memory cells in a memory device involving 16 logical sectors starting at LBA 1000. The command in command slot 2 e.g., 687-2A, can be a command to read data from memory cells in the memory device involving 4 logical sectors starting at LBA 2000. The command in command slot 3 e.g., 687-3A, can be a command to program data into the memory cells in the memory device involving 48 logical sectors of data starting at LBA 1000. The command in command slot 4, e.g., 687-4A, can be a command to read the data in the memory cells in a memory device involving 10 logical sectors of data starting at LBA 2002. The command in command slot 5, e.g., 687-5A, can be a command to read memory cells in the memory device involving 16 logical sectors of data starting at LBA 2000. The command in command slot 6, e.g., 687-6A, can be a command to program memory cells in the memory device involving 16 logical sectors of data starting at LBA 1040. The command in command slot 7, e.g., 687-7A, can be a command to program memory cells in the memory device involving 2 logical sectors of data starting at LBA 3000. The command in command slot 8, e.g., 687-8A, can be a command to program memory cells in the memory device involving 2 logical sectors of data starting at LBA 3002.

The commands held in the command queue 686A at any particular time may be associated with one memory device, e.g., all corresponding to the same channel, or may be associated with a number of different memory devices, e.g., corresponding to a plurality of channels. The particular channel with which a command is associated can be determined from the LBA, according to the amount and division of physical memory with respect to each channel, as mapped by a logical-to-physical address map, e.g., address map 461 in FIG. 4. For example, the physical block address may include channel identification information.

The commands held in command queue 686A can be modified in accordance with one or more embodiments of the present disclosure. For example, the commands in command slots 687-1, 687-3, and 687-6 may be combined into a single command to program the memory cells involving 56 logical sectors starting at LBA 1000. Thus, the command dispatcher can be configured to determine that at least two commands are for a same operation, e.g., a write operation but involving logically adjacent memory locations. The command dispatcher can optimize distribution of commands to the back end channels by combining the at least two commands into a single command involving the combination of the logically adjacent memory locations. The combined command is most efficient where the logically adjacent memory locations are associated with a single channel.

FIG. 6B illustrates a block diagram of channel command queue 686B after the commands shown in FIG. 6A have been modified in accordance with one or more embodiments of the present disclosure. As shown in FIG. 6B, command 1 held in channel command slot 687-1B is a command to program the memory cells in the array corresponding to 56 logical sectors of the host starting at LBA 1000. Command 2 held in channel command slot 687-2B is a command to read the memory cells in the array corresponding to 16 logical sectors of the host starting at LBA 2000, and command 3 held in channel command slot 687-3B is a command to program the memory cells in the array corresponding to 4 logical sectors of the host starting at LBA 3000.

The command dispatcher can also be configured to determine that at least two commands are for a same operation, e.g., a write operation but involving logically overlapping memory locations, e.g., the memory location involved with one command includes at least a portion of a memory location involved with another command of the same type. The command dispatcher can optimize distribution of commands to the back end channels by combining the at least two commands into a single command involving the combination of the logically overlapping memory locations.

Other command modifications may be possible. For example, where the command processor portion can determine that a first command in command queue 686A involving a particular memory location, e.g., LBA, may be executed before a second command which will overwrite the particular memory location, the command processor portion may not distribute (e.g., delete, ignore, not execute) the first command to its destination channel since the results thereof will only be temporary, e.g., until the second command is executed.

The above-mentioned example can be further understood with respect to FIG. 6. Assuming commands nearer the top of the command queue 686A, e.g., command slot 687-1, are to be executed before commands nearer the bottom of the command queue 686A, e.g., command slot 687-C. The LBA of the commands in command slot 1, e.g., 687-1A, and command slot 3 e.g., 687-3A, are both 1000. Command 1 and command 3 are both program operations. Since command 3 will program 48 sectors starting at LBA 1000, command 3 will completely overwrite whatever is programmed in the 16 sectors starting with LBA 1000 as a result of command 1. There is an intervening read operation, e.g., command 2; however, command 2 does not involve the 16 sectors starting with LBA 1000. Therefore, command 1 need not be distributed (e.g., deleted, ignored, not executed), thereby saving time by not having to transfer command 1 to a channel and optimizing the distribution of commands from the command queue 686A and among the plurality of back end channels, as well as the speed at which the command queue 686A may accept additional host commands. Other command re-ordering, combining, and deleting may be possible to optimize, e.g., economize, distribution of the commands shown in command queue 686A to the number of back end channels.

The command dispatcher thus can be configured to determine a net change to memory to be accomplished by the number of commands in the command queue 686A, and modify the number of commands held in the command queue 686A based on the determination, thereby optimizing distribution of the number of commands among the plurality of back end channels. The command dispatcher can be configured to not distribute (e.g., delete, ignore, not execute) one of the number of commands from the command queue 686A when the command dispatcher can determine from the commands held in the command queue 686A at any given time that doing so will not change the determined net change to memory by the number of commands. For example, the command dispatcher can be configured to modify a memory range associated with a first command in the command queue 686A to include a portion of the memory range of a second command in the command queue 686A, and thereafter delete the second command from the command queue 686A without changing the determined net change to memory to be accomplished by the number of commands.

As described above, the dispatcher portion of the command dispatcher can distribute commands, e.g., host commands, to a number of appropriate channels. The dispatcher portion can distribute a particular command to an appropriate channel, for example, where a payload associated with the particular command involves a single channel. For a payload involving multiple channels, the dispatcher portion can manage the distribution of the associated command by distributing the particular command to the multiple channels, including its channel-specific parameters for operating the respective memory devices corresponding to the particular logical block address and sector count associated with a command. The payload associated with the command can then be parsed, with portions thereof being distributed among the multiple channels, e.g., in a round robin fashion. Similarly for a read operation, the payload associated with a read command may be distributed among multiple backend channels, and a corresponding read command may be distributed to the associated backend channels in order to assemble data from among the multiple channels.

Each back end channel can, for example, process R consecutive logical block addresses (LBAs), but a host command (i.e., a command received from a host) can involve a relatively large number of sectors. The command dispatcher can distribute back end commands in a round robin fashion among a number of back end channels, where each back end command mimics the host command except that each back end command involves R consecutive LBAs. The round robin process continues until all of the sectors of the host command are distributed in R-size "chunks" among the back end channels.

For further illustration, consider the following numerical example, where a host command is to write 128 sectors of data, where there are 4 back end channels, and where each back end channel can process 8 consecutive LBAs. For simplicity, memory location offsets will be ignored in this example. Upon receipt of the host write command involving 128 sectors, multiple back end write commands are generated in response to the single host write command. A first back end write command can involve a first 8 LBAs going to back end channel 1, then a second back end write command can involve the next 8 LBAs going to back end channel 2, a third back end write command can involve the next 8 LBAs going to back end channel 3, a forth back end write command can involve the next 8 LBAs going to back end channel 4. This round robin processing continues with the first back end write command also involving the next 8 LBAs going to back end channel 1, until all 128 sectors are distributed among the 4 channels.

As a result, each channel will have received 32 sectors of payload corresponding to the host write command, but assembled as a collection of 8 LBA portions strung together. Thereafter, the respective write command is distributed to the respective back end channels to write 32 sectors of data. Thus, a single host command can result in N back end commands (where there are N back end channels), each mimicking the host command action but involving approximately 1/Nth of the payload associated with the host command. Only one command per channel is distributed, along with a respective portion of the payload associated with the host command. Embodiments of the present disclosure are not limited to the numerical example quantities described here, and are not limited to write commands. One skilled in the art will understand that other commands (e.g., read commands) may be similarly distributed in parallel among multiple channels (e.g., to read data from among a number of back end channels) resulting from a single host command.

In one or more embodiments, commands in the command queue 686A can be modified by combining a number of commands into a single command so as to eliminate or reduce partial page programming operations, e.g., combining partial pages together into a single operation. In addition to improving performance and reliability of the memory system by reducing wear associated with partial page programming, combining commands in the front end command queue 686A optimizes distribution of the number of commands among the plurality of back end channels, since multiple programming commands can be reduced to a fewer number of commands, e.g., a single command.

Partial page programming operations are performed by finding a new block of memory cells that is free, reading a page from an old block into a data buffer, merging new data in to the data buffer, writing the entire page (including the merged data) to a new page of memory in a new block, moving all the other pages of the old block to a new block, and marking the old block to indicate that it is to be erased. While several examples have been given to illustrate algorithms used for combining commands which optimizes distribution of the number of commands among the plurality of back end channels, embodiments of the present disclosure are not limited to the examples provided, and the present disclosure contemplates other optimizing techniques, such as those that involve deleting or re-ordering commands at the front end to reduce the quantity of commands that are distributed among the plurality of back end channels.

In one or more embodiments, a memory controller includes a plurality of back end channels, and a command queue, e.g., 386 in FIG. 3, communicatively coupled to the plurality of back end channels. The command queue, e.g., 386 in FIG. 3, can be configured to hold host commands received from a host. Circuitry is configured to generate a number of back end commands at least in response to a number of the host commands in the command queue, e.g., 386 in FIG. 3, and distribute the number of back end commands to a number of the plurality of back end channels.

The number of back end commands can be fewer, or greater, than the number of the host commands. For example, in one or more embodiments the circuitry can be configured to generate a back end command corresponding to each of the plurality of back end channels in response to a single host command. The circuitry can be further configured to distribute the corresponding back end command to its respective back end channel such that the back end commands are processed substantially in parallel. In one or more embodiments the circuitry can be configured to distribute multiple host commands among different multiple back end channels such that the multiple host commands are executed substantially simultaneously.

Generating the number of back end commands can include the combination of modifying at least one of the number of host commands and deleting at least another one of the number of host commands. A Direct Memory Access module (DMA) can be configured to distribute data associated with a host command corresponding to the number of back end commands generated.

Upon completion of a respective back end command, the circuitry can be configured to communicate to the host results from executing a particular one of the multiple back end commands upon completion of the particular one of the multiple back end commands, without regard to completion of execution of any other of the multiple back end commands.

Figure 7:
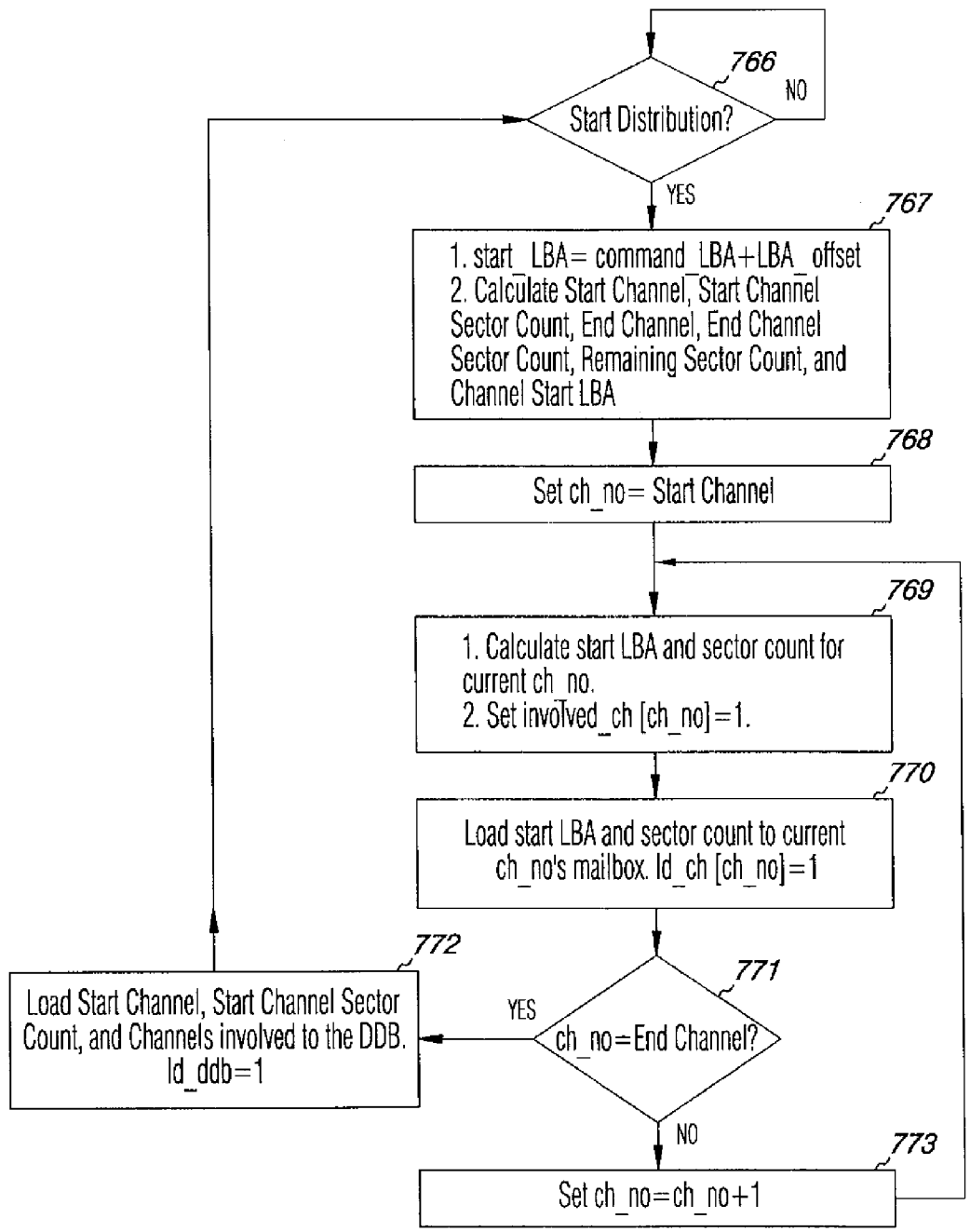
FIG. 7 is a flow diagram for distributing commands among a number of back end channels, in accordance with one or more embodiments of the present disclosure.

FIG. 7 is a flow diagram for distributing commands among a number of back end channels, in accordance with one or more embodiments of the present disclosure. The command distribution starts at 766. At 767 the starting LBA of a distributed command can be set to the sum of a command LBA and an LBA offset. The starting channel can be determined, e.g., calculated, along with the starting channel sector count, ending channel, ending channel sector count, remaining sector count and a channel starting LBA. At 768 the channel number, e.g., to which the command is initially distributed, can be set to the starting channel. Then at 769, a starting LBA and sector count can be determined, e.g., calculated, for the current channel, and the channel involved status bit, e.g., involved_ch, can be asserted for the particular current channel number to indicate that a particular channel is involved with a particular command.

Next at 770, the starting LBA and sector count for the current channel are loaded to the current channel's inbox (channel inboxes are discussed further below). Whether the current channel is the end channel (see 767) can be determined at 771. If the current channel is not the end channel, the distribution process moves to the next channel, e.g., the current channel number can be incremented, at 773, and the process continues at 769 (the starting LBA and sector count for the current channel are loaded to the current channel's inbox). If the current channel is the end channel, the start channel, channel sector count and channels involved are loaded to the DMA Descriptor Block (DDB; discussed further below) at 772, and the process returns to start the next command distribution back at 766.

Figure 8:
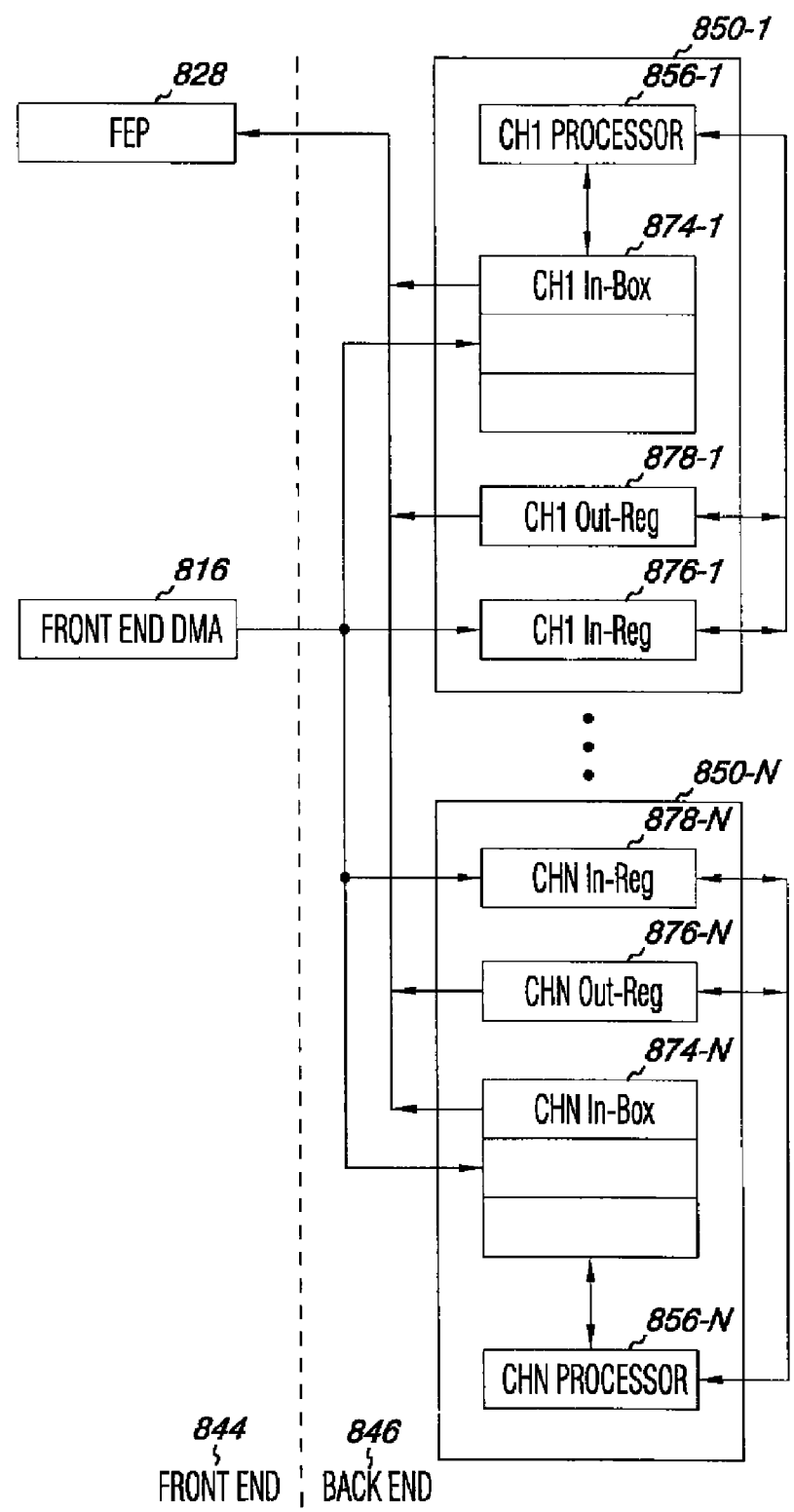
FIG. 8 is a functional block diagram illustrating an interface between a front end and a number of channels, in accordance with one or more embodiments of the present disclosure.

FIG. 8 is a functional block diagram illustrating one embodiment of an interface between a front end and a number of channels, in accordance with one or more embodiments of the present disclosure. FIG. 8 shows a number of channels, e.g., 850-1, ..., 850-N, located in a back end portion 846 of a memory controller, which may be analogous to channels 350-1, ..., 350-N shown in FIG. 3; however, some of the channel detail shown on FIG. 3 is omitted for clarity in FIG. 8 so that additional structure may be shown in greater detail.

FIG. 8 also shows a front end DMA 816 and front end processor 828 (FEP) located in a front end portion 844 of the memory controller. The front end DMA 816 may be analogous to the front end DMA 316 in FIG. 3, and the FEP 828 may be analogous to the FEP 328 in FIG. 3. The front end DMA 816 and the FEP 828 are respectively shown in FIG. 8 as being communicatively coupled to each of the number of channels, e.g., 850-1, ..., 850-N, in a manner described in further detail below.

Each channel includes a channel processor, e.g., 856-1, ..., 856-N, a channel in-box, e.g., 874-1, ..., 874-N, a channel in-register, e.g., 876-1, ..., 876-N, and a channel out-register, e.g., 878-1, ..., 878-N. Each of the channel out-register and in-box are communicatively coupled to provide information to the FEP 828. Each of the channel in-box and in-register are communicatively coupled to receive information from the front end DMA 816.

Front End Direct Memory Access (DMA)

FIG. 9A is a functional block diagram of a Direct Memory Access module (DMA) Descriptor Block, implemented in accordance with one or more embodiments of the present disclosure. A DDB controls data flow between the host and the back end channels, and functions to optimize system throughput, e.g., using intelligent decision making relative to commands held in the command queue, e.g., 386 in FIG. 3, in order to increase the efficiency of distributing the commands from the command queue, e.g., 386 in FIG. 3, to the various back end channels and thereby increasing the speed of commands thorough the command queue, e.g., 386 in FIG. 3.

For a memory system having a number of memory devices accessed through corresponding channels, e.g., a solid state drive, the payload associated with a write command can be programmed to a number of channels, and the payload associated with a read command may be assembled from a number of channels. In managing a payload associated with a particular command that involves multiple channels, the DMA distributes the data among the appropriate channel(s). For example, the DMA manages distributing a payload associated with a write command to a number of channels, and assembling a payload associated with a read command from a number of channels. The DMA also facilitates multiple, including parallel, command execution by managing the payload associated with multiple commands between the host and back end channels.

The DDB, e.g., 340 in FIG. 3, coordinates the distribution of payload to and from the N channels when a command is issued. For example, during a write or read operation, a number of the N channels can be used. The DDB can be first updated, e.g., loaded, by the command dispatcher, e.g., 318 in FIG. 3, or the front end processor (FEP), e.g., 328 in FIG. 3, where the DDB TAG can be the address for each host command. The DDB can be set up by either the FEP or the command dispatcher. No further management by the FEP of the I/O processor can be necessary during "no error" conditions.

FIG. 9A shows the contents of a DDB 988 having a number of TAG address entries, e.g., DDB 1, ..., DDB 32. Each TAG address entry contains parameters associated with the set up 990, the status 992, and command information 994 associated with a data transfer. According to one or more embodiments of the present disclosure, the TAG addressing may be implemented according to Serial Advanced Technology Attachment (SATA) standards. Thus the DDB entry can determine which channel to access, how many sectors to transfer for a particular channel, and the associated status, among other information. DDB can be backwards compatible by using only DDB 1 for legacy commands that do not support multiple command queuing, e.g., only one legacy command is processed through the DDB at a time instead of multiple commands being simultaneously managed in the DDB.

Each entry in the DDB 988 has a TAG, which can be either assigned or implied. In one or more embodiments, the TAG can be the same as the entry number, e.g., the physical position of the entry in the DDB, thus, the physical location of the entry in the DDB implies the TAG so that an actual TAG number field need not be stored with each entry. As the controller receives a host command, and it adds a new entry to the DDB corresponding to the host command, each entry being associated with a TAG, and outputs the TAG associated with the new entry. The controller maintains a command queue, e.g., 386 in FIG. 3, as previously described, receives the TAG associated with the new entry, adds a new command queue entry corresponding to the TAG, and outputs a range operation request.

FIG. 9B illustrates an entry in the DMA Descriptor Block (DDB) illustrated in FIG. 9A, implemented in accordance with one or more embodiments of the present disclosure. FIG. 9B indicates data fields of a DDB entry by type, (e.g., set-up, status, info), description, size (e.g., number of bits), and location within the entry (e.g., bit positions).

The next count data field 990A of each DDB entry, e.g., "next_cnt" at bit positions 93-96, represents the number of sectors of data to transfer for one given channel. The next count can be initialized by the command dispatcher or FEP to specify the first transfer count of the starting channel. The next count can be updated by hardware to specify the transfer count of the preceding channel. The update occurs after the current channel completes its transfer, but before the overall transfer is complete. If the remaining number of overall sectors to transfer is greater than the maximum amount of sectors a channel can transfer, e.g., the count is greater than the sector count per page times the number of planes, then next count can be loaded with that maximum amount of sectors. Otherwise, next count can be loaded with the remaining number of overall sectors to transfer.

The count data field 990B, e.g., "cnt" at bit positions 80-95, can be the overall transfer count for a particular command. The count can be initialized by the command dispatcher or FEP with the total transfer count and can be updated by hardware to indicate the remaining number of sectors to transfer. According to one or more embodiments, bit position 79 is not used, e.g., it is reserved for future use.

The transfer complete data field 990D, e.g., "XC" bit at position 78, indicates that the DMA transfer is complete. That is, the data phase may be completed, but the indicator of command complete status may not have been sent. This bit can be set by hardware once channel status ("ch_status") is equal to a particular value, to indicate that the host command is complete. Hardware then schedules the sending of the indicator o a command complete status. When the indicator is successfully sent to the host, the hardware operates to clear the valid data field, e.g., "V" flag, before another host command can be received, as described later.

The host error data field 992A, e.g., "HE" bit at position 77, can be used to indicate that an error occurred. This bit can be set by the I/O processor or the host interface, e.g., 314 in FIG. 3, if the error occurs during host transfer. The flash error data field 992B, e.g., "FE" bit at position 76, can be used to indicate that a memory device, e.g., NAND flash, error occurred.

The valid data field 992C, e.g., "V" bit at position 75, can be used to indicate a valid entry. This bit can be set by the command dispatcher or FEP, e.g., V=1, to indicate that the hardware has access to the DDB entry, and the command dispatcher or FEP may not over-write the entry. This bit can be cleared by hardware after host command is completed and the indicator has been successfully sent to the host, or it can be cleared by FEP when there is an error while processing the command, e.g., V=0, to indicate that entry in the DDB is available to receive a new command from host.

The next channel data field 992D, e.g., "nxt_ch" at bit positions 72-74, refers to the channel where the transfer will occur. This field can be initialized by the command dispatcher or FEP to specify the starting channel for the transfer and can be updated by hardware to specify the next channel for transfer. Updates occur when the previous channel finishes transferring all of the consecutive LBAs that the channel can process. The sector count for the particular command may not have reached zero, since there may be remaining sectors to transfer for the particular command, including additional rounds to the channel as part of a round-robin distribution, as described above. For one channel, the sector count for the particular command will reach zero, when there are no remaining sectors to transfer for the particular command, e.g., the last channel in a round robin sequence to which payload is distributed.

The active channel data field 992E, e.g., "active_ch" at bit positions 64-71, can be an N-bit signal, e.g., 8-bit corresponding to 8 channels, where each bit represents the completion status of its respective channel. Before a transfer occurs, the bits corresponding to each involved channel can be set. Each bit can then be reset once the command is complete for that channel.

The command information data field 994, e.g., "CMD_info" at bit positions 0-63, can comprise four words from a Frame Information Structure (FIS) register, including command, priority bit, FUA bit, LBA, and sector count.

Although particular data field sizes, e.g., one bit, and data field positions are described in the example above, embodiments of the present disclosure are not limited to those including every such described field, or to the specific data field sizes or positions, and may include additional or alternative fields. When the command dispatcher is updating the DDB, an input signal, e.g., "xfer_TAG," becomes the DDB's address pointer and an update signal, e.g., "update_ddb_en," becomes the write enable.

The arbiter, e.g., 342 in FIG. 3, can be a round robin arbiter that determines which channel can be accessed at a particular time. The arbiter searches for the next available channel. The arbiter steps through the channels, attempting to match a selected available channel number with the next channel in a particular DDB entry. If the available channel does not match the DDB entry, the arbiter continues, repeating in round robin fashion if necessary, until a match between a selected available channel number and the next channel in a particular DDB entry can be found. Once a match is found, the arbiter initiates a communication protocol to start the transfer. At the completion of a transfer, a completion protocol can be signaled, channel information in the DDB entries are updated, and the arbiter searches for the next available channel.

Each of the N bits of the active channel field 992E, e.g., register, of a particular TAG entry corresponds to a respective one of the N channels. Once a channel can be deemed available for a particular host command, the bit associated with that channel can be set. When a channel completes transfers to the particular channel for a given host command, the channel's command complete status can be set, which in turn, can reset the respective bit in the active channel field of the DDB entry. Once all bits of the active channel are reset, an indicator of the "complete" status of a host command can be issued to the application layer. The application layer can then send an indicator of the "complete" status of the host command to the host. The valid bit of the entry can be cleared (e.g., V=0) by hardware after the host command is completed and an indicator of the "complete" status has been successfully sent to the host, or it can be cleared by a FEP, for example, when there is an error while processing the command to indicate that the entry in the DDB is available to receive a new command from the host.

Command completions are based on a back end channel indicating that a requested transfer is complete. According to one or more embodiments of the present disclosure, during read operations associated with multiple commands being executed simultaneously across multiple channels, the DMA transmits data from any of the channels to the host as soon as the data is ready regardless of the order in which the commands were received from the host. Memory system data throughput can be substantially increased by executing commands, e.g., transferring data read from the memory devices back to the host, in the order in which the commands have been at least partially completed by each back end channel, rather than in the order in which the commands were received or initiated.

For example, a first read command can be received by the memory system from the host and execution by the memory system can be initiated, followed by a second read command being received by the memory system from the host and its execution by the memory system being initiated. However, the second read command can be completed first. According to one or more embodiments, rather than wait for completion of the first read command so that its data can be returned first to the host, the data resulting from the second read command can be returned to the host before the data resulting from the first read command can be returned to the host.

For another example, a first read command can be received by the memory system from the host, followed by a second read command being received by the memory system from the host. However, for efficiency, the memory system can re-order the commands, e.g., in a manner previously described, and execute the second read command before executing the first read command, which results in the second read command being completed before the first read command. According to one or more embodiments, rather than wait for completion of the first read command, the data resulting from the second read command can be returned to the host as it is completed, which can be before the data resulting from the first read command can be returned to the host.

In operating multiple memory devices, the payload associated with a single command, portions of which have a certain sequential order relating them to one another, can be distributed across different channels, e.g., a first portion of the payload may be stored in a first memory device and a second portion of the payload may be stored in a second memory device, etc. Therefore, portions of the data, e.g., resulting form a read command, may be returned to the front end of the controller from the different memory devices (and associated channels) out of sequential order, e.g., the second portion may be retrieved from the second memory device before the first portion can be retrieved from the first memory device. According to one or more embodiments, when DMA buffer offset can be supported, the portions can be transferred back to the host out of sequential order, in the order the commands are completed by the respective back end channels, rather than in the sequential order in which the portions are related.

In other words, a number of portions of a payload associated with a single command are stored, e.g., reside, among several memory devices of a solid state drive. The portions of the payload are related to one another by a particular order in forming the payload. A single read command can be used to assemble the payload from among several memory devices, the read command being appropriately customized with respect to particular memory location and distributed to each of the several channels corresponding to the several memory devices in order to receive a respective portion of the payload from each of the several memory devices. According to one or more embodiments, the portions are received by the memory system controller and sent to the host as they are received, in an order that can be different than the particular order that the portions of the payload are related to one another in forming the payload. In other words, the portions of the payload are not reassembled into the payload before being sent to the host, and instead portions of the payload are sent as they are received to the controller from among the several memory devices.

According to one or more embodiments of the present disclosure, during operations of multiple commands, e.g., write commands, being executed simultaneously across multiple channels, e.g., to corresponding multiple memory devices, the DMA can send an indicator of the command completion status for a particular command to the host upon completion of the command, which allows the host to send the next pending command. In one or more embodiments, the multiple channels are asynchronous channels, and command, e.g., host command, execution may not occur in the same order as the command was received from the host (relative to other commands received from the host).

For example, a first command can be received by the memory system from the host and its execution initiated by the memory system, followed by a second command being received by the memory system from the host and its execution initiated by the memory system. However, the second read command can be completed first by a number of the multiple back end channels. According to one or more embodiments, rather than wait for completion of the first command so that an indicator of the completion status of the first command can be sent to the host before an indicator of the completion status of the second command can be sent to the host, the indicator of the completion status of the second command can be sent to the host before the indicator of the completion status of the first command is sent to the host.

For another example, a memory controller, e.g., of a memory system, receives a first command from the host, followed by receipt of a second command by the memory controller from the host. However, the memory system re-orders the commands, e.g., in a manner previously described, and executes the second command before executing the first command, which results in the second command being completed before the first command. According to one or more embodiments, rather than wait for completion of the first command so that an indicator of the completion status of the first command can be sent to the host before an indicator of the completion status of the second command can be sent to the host, the indicator of the completion status of the second command can be sent to the host before the indicator of the completion status of the first command is sent to the host.

CONCLUSION

The present disclosure includes memory controllers, memory systems, solid state drives and methods for processing a number of commands. In one or more embodiments, a memory controller includes a plurality of back end channels, and a command queue, e.g., 386 in FIG. 3, communicatively coupled to the plurality of back end channels. The command queue 386 can be configured to hold host commands received from a host. Circuitry is configured to generate a number of back end commands at least in response to a number of the host commands in the command queue 386, and distribute the number of back end commands to a number of the plurality of back end channels.

The present disclosure also includes methods and devices for a memory controller. In one or more embodiments, a memory controller includes a plurality of back end channels, and a front end command dispatcher communicatively coupled to the plurality of back end channels. The command dispatcher is communicatively coupled to a command queue, e.g., 386 in FIG. 3, which is configured to buffer a number of commands. The command dispatcher can be configured to determine a net change to memory to be accomplished by the number of commands and modify at least one of the number of commands based on the determination to optimize distribution of the number of commands among the plurality of back end channels.

In the detailed description of the present disclosure, reference is made to the accompanying drawings that form a part hereof, and in which is shown by way of illustration how one or more embodiments of the present disclosure may be practiced. These embodiments are described in sufficient detail to enable those of ordinary skill in the art to practice the embodiments of this disclosure, and it is to be understood that other embodiments may be utilized and that process, electrical or structural changes may be made without departing from the extent of the present disclosure.

As used herein, the designators "N," "M," and "C," particularly with respect to reference numerals in the drawings, indicate that a number of the particular feature so designated can be included with one or more embodiments of the present disclosure. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

It will be understood that when a first element is referred to as being "connected to" or "coupled with" another element, the element is physically attached to the of the two elements is intended. In contrast, when elements are referred to as being "communicatively coupled," the elements are in communication with one another, including but not limited to, by hardwired or wireless signals paths.

It will be understood that when an element is referred to as being "on," "connected to" or "coupled with" another element, it can be directly on, connected, or coupled with the other element or layer or intervening elements or layers may be present. In contrast, when an element is referred to as being "directly on," "directly connected to" or "directly coupled with" another element or layer, there are no intervening elements or layers present. As used herein, the term "and/or" includes any and all combinations of a number of the associated listed items.

It will be understood that, although the terms first, second, etc. may be used herein to describe various elements, components, regions, layers, and sections, these elements, components, regions, wiring lines, layers, and sections should not be limited by these terms. These terms are only used to distinguish one element, component, region, wiring line, layer, or section from another region, layer, or section. Thus, a first element, component, region, wiring line, layer or section discussed below could be termed a second element, component, region, wiring line, layer, or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures rather than an absolute orientation in space. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and "comprising," when used in this specification, specify the presence of stated features, integers, steps, operations, elements, or components, but do not preclude the presence or addition of a number of other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

Embodiments of the present disclosure are described herein with reference to functional block illustrations that are schematic illustrations of idealized embodiments of the present disclosure. As such, variations from the shapes of the illustrations as a result, for example, of manufacturing techniques and tolerances, are to be expected. Thus, embodiments of the present disclosure should not be construed as limited to the particular shapes of regions illustrated herein but are to include deviations in shapes that result, for example, from manufacturing. For example, a region illustrated or described as flat may, typically, have rough or nonlinear features. Moreover, sharp angles that are illustrated may be rounded. Thus, the regions illustrated in the figures are schematic in nature and their shapes and relative sizes, thicknesses, and so forth, are not intended to illustrate the precise shape/size/thickness of a region and are not intended to limit the scope of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory controller, comprising:
a plurality of back end channels; and
a front end command dispatcher communicatively coupled to the plurality of back end channels and a command queue configured to hold a number of write commands, wherein the command dispatcher is configured to determine a net change to memory to be accomplished by the number of write commands, and to modify one or more of the number of write commands in order to optimize distribution of the number of write commands among the plurality of back end channels.

2. The memory controller of claim 1, wherein the command dispatcher is configured to modify the one or more of the number of write commands in order to optimize distribution only when the plurality of back end channels are busy.

3. The memory controller of claim 1, wherein the command dispatcher is configured to not distribute one of the number of write commands from the command queue without changing the determined net change to memory by the number of write commands.

4. The memory controller of claim 3, wherein the command dispatcher is configured to modify a memory range associated with a first write command in the command queue to include a portion of the memory range of a second write command in the command queue, and thereafter not distribute the second write command from the command queue without changing the determined net change to memory by the number of write commands.

5. The memory controller of claim 1, wherein the number of write commands are received in the command queue in an initial order, and the command dispatcher is configured to change an order of the number of write commands in the command queue from the initial order to a changed order.

6. The memory controller of claim 5, wherein the command dispatcher is configured to distribute commands according to the changed order of the number of write commands in the command queue rather than according to the initial order.

7. The memory controller of claim 1, wherein the command dispatcher is configured to modify at least one of the number of write commands in the command queue by combining commands to overlapping memory locations.

8. The memory controller of claim 7, wherein the command dispatcher is configured to change an order of the number of write commands in the command queue to a changed order in response to at least one of the number of write commands being modified.

9. The memory controller of claim 7, wherein the command dispatcher is configured to not distribute a write command determined to involve a number of memory locations that will be overwritten by a write command to be subsequently-executed in the command queue.

10. The memory controller of claim 7, wherein the command dispatcher is configured to not execute a write command determined to involve the number of memory locations that will be overwritten by a subsequently-executed write command without an intervening read operation involving the number of memory locations.

11. The memory controller of claim 7, wherein the command dispatcher is configured to group multiple write commands into a single write command.

12. The memory controller of claim 11, wherein the command dispatcher is configured to determine that at least two write commands are a same operation involving logically adjacent memory locations, and combine the at least two write commands into a single write command involving the logically adjacent memory locations.

13. The memory controller of claim 11, wherein the command dispatcher is configured to determine that at least two write commands are a same operation involving logically overlapping memory locations, and combine the at least two write commands into a single write command involving the logically overlapping memory locations.

14. The memory controller of claim 1, wherein the payload associated with a particular write command is distributed among more than one of the plurality of back end channels, and the command dispatcher is configured to distribute the particular write command to each of the more than one of the plurality of back end channels.

15. The memory controller of claim 14, wherein the command dispatcher is configured to determine an associated logical block address and sector count for a portion of the payload associated with each of the more than one of the plurality of back end channels, and modify the particular write command distributed to a respective back end channel with the logical block address and sector count for the associated portion of the payload.

16. The memory controller of claim 1, wherein the command dispatcher is configured to modify write commands in the command queue during a time when the command dispatcher is prevented from distributing commands to the plurality of back end channels.

17. A memory controller, comprising:
a plurality of back end channels; and
a front end command dispatcher communicatively coupled to the plurality of back end channels and a command queue configured to hold a number of write commands, wherein the command dispatcher is configured to determine a net write to memory to be accomplished by the number of write commands, and to provide write commands to accomplish the net write among the plurality of back end channels using fewer than the number of write commands.

18. The memory controller of claim 17, wherein the front end command dispatcher is configured to delete one or more of the number of write commands that involves a portion of memory that is subsequently overwritten by other of the one or more of the number of write commands without a corresponding modification of remaining one or more of the number of write commands.

19. The memory controller of claim 17, wherein the front end command dispatcher is configured to delete one or more of the number of write commands and modify another of the one or more of the number of write commands to accomplish a write of the deleted one or more of the number of write commands.

20. A memory controller, comprising:
- a plurality of back end channels, each back end channel corresponding to a different memory device;
- a command queue configured to hold a number of write commands; and
- a front end command dispatcher communicatively coupled to the plurality of back end channels and the command queue, wherein the command dispatcher includes a command processor portion configured to determine a net write to memory to be accomplished by the number of write commands, and to delete and/or modify one or more of the number of write commands in order to reduce a quantity of write commands distributed among the plurality of back end channels.

* * * * *